United States Patent [19]

Finn et al.

[11] Patent Number: 4,883,288
[45] Date of Patent: Nov. 28, 1989

[54] SUSPENSION STRUT WITH SIDE LOAD SUPPORT

[75] Inventors: Bernard J. Finn, Traverse City; Gene R. Hawkins, Warren, both of Mich.

[73] Assignee: General Motors Corporation, Detroit, Mich.

[21] Appl. No.: 260,338

[22] Filed: Oct. 20, 1988

[51] Int. Cl.[4] .......................... B60G 3/06; B60G 11/62
[52] U.S. Cl. ..................................... 280/672; 280/663; 280/691; 280/693; 188/322.11
[58] Field of Search ............... 280/672, 663, 668, 691, 280/693, 697, 696, 712, 713, 702; 267/64.21, 64.23, 64.24, 122; 188/322.12, 322.11

[56] References Cited

U.S. PATENT DOCUMENTS

| | | | |
|---|---|---|---|
| 3,362,498 | 1/1968 | Allison | 180/73.1 |
| 3,573,880 | 4/1971 | Sakai | 280/668 |
| 3,603,574 | 9/1971 | Lutz | 267/34 |
| 3,727,940 | 4/1973 | Hug | 280/668 |
| 4,688,774 | 8/1987 | Warmuth, II | 280/712 |
| 4,778,198 | 10/1988 | Gold | 280/711 |
| 4,779,893 | 10/1988 | Juechter | 280/668 |

FOREIGN PATENT DOCUMENTS

| | | | |
|---|---|---|---|
| 0063016 | 10/1982 | European Pat. Off. | 280/697 |
| 2431675 | 1/1976 | Fed. Rep. of Germany | 280/668 |

Primary Examiner—Charles A. Marmor
Assistant Examiner—Karin Tyson
Attorney, Agent, or Firm—Dean L. Ellis

[57] ABSTRACT

Steerable vehicle suspension in which lateral support is provided to the strut body as opposed to support of the strut rods to eliminate or minimize the bending loads and the strut rod. This support and provides equilibrium against the moment from the offset of the wheel load to the ball joint. The lateral support is provided by a support bracket which is attached to the inner race of the upper strut mount and turns about the kingpin axis with the strut and spring assembly during steering maneuvers. One or more rolling elastomer elements are disposed between the support bracket and the strut body. These elements provide support while allowing relative vertical motion to occur between the support bracket and the strut.

5 Claims, 2 Drawing Sheets

SUSPENSION STRUT WITH SIDE LOAD SUPPORT

FIELD OF THE INVENTION

This invention relates to vehicle suspension struts operatively mounting fixed and steerable road wheels to support structure in a vehicle and featuring new and improved side load support for the strut components and particular those subject to high friction loads during strut operation.

DESCRIPTION OF RELATED ART

In many vehicle suspension strut designs the piston rod is supported at its upper end by the top mount affixed to the mounting tower in the vehicle body work while the lower end of the strut is operatively connected to a road wheel through a wheel mounting knuckle and its attachment bracketry. With such construction the road wheel and its tire patch are laterally offset from a ball joint steerably connecting the knuckle to a lower control arm that pivots from the engine cradle. This wheel offset causes a moment on the knuckle and since the end of the piston rod of the strut is supported by the mount, this moment unless neutralized imparts a side load to the strut and a bending moment to the strut piston rod. This results in binding and accelerated wear in the strut piston rod guide and piston-cylinder tube areas during operation. To reduce such binding wear various side load support constructions have been provided. For example in U.S. Pat. No. 3,603,574 issued Sept. 7, 1971 a suspension strut is disclosed in which an annular spacer is mounted either on the piston rod or on the cylinder wall between the piston and the end wall of the cylinder through which the piston rod passes to limit piston rod deflection in response to side loads. In U.S. patent application Ser. No. 100,539 filed Sept. 4, 1978, U.S. Pat. No. 4,779,893 assigned to the assignee of this invention and hereby incorporated by reference another suspension strut is disclosed in which an elastomer spring is interposed between a control arm and a wheel support knuckle to provide a force couple to counterbalance the couple produced by the offset road wheel from the pivot connection of the knuckle and the control arm.

SUMMARY OF THE INVENTION

This invention is of the general category of the above referenced U.S. Pat. No. 3,603,574 and application Ser. No. 100,539, U.S. Pat. No. 4,779,893 and more particularly is drawn to a strut type suspension capable of being steered with a new and improved side load support which provides a force directed laterally to the strut body rather than to the strut rod or some other component as described above. This side load support is provided by a support bracket which, in the preferred embodiment, is operatively attached to the rotatable lower ball bearing race of the upper mount and accordingly turns about the theoretical kingpin axis along with the strut and spring assembly during steering maneuvers. In addition to the bracket the lateral support is provided by one or more rolling spring elements of a suitable elastomer material preloaded and operatively disposed between the support bracket and the strut body. The spring elements are preferably cylindrical in configuration although they may be spherical, barrel shaped or have other suitable configurations. The support bracket and the rolling elastomer spring element associated therewith provide side support while allowing a relative vertical motion to take place between the strut body which is attached to the unsprung wheel assembly and the support bracket which is attached to the spring vehicle body. Accordingly this invention provides lateral support of a suspension strut by a rolling side load support spring that applies a lateral force to the cylindrical strut body rather than to the piston rod or other component associated with the strut.

In one preferred embodiment of this invention a preloaded rolling elastomer cylindrical element arcuate in plan view and operative between a support bracket and strut housing provides the support load while allowing relative vertical motion during suspension ride excursions. A pair of ramps extending upward and downward from a low starting station are provided in the support bracket that cooperates with the strut housing to form a packet to trap the rolling elastomer element and make it self centering. This is because the elastomer element will roll on the appropriate ramp and be squeezed with a greater constricting force as the element rolls on a ramp when the strut moves from the low starting station which in this invention defines a nominal design trim position for the vehicle. The elastomer element will seek the nominal design trim position on reversal of the strut travel because this is the position of least potential energy in the squeezed elastomer element.

DESCRIPTION OF THE PREFERRED EMBODIMENTS

Figure 1:
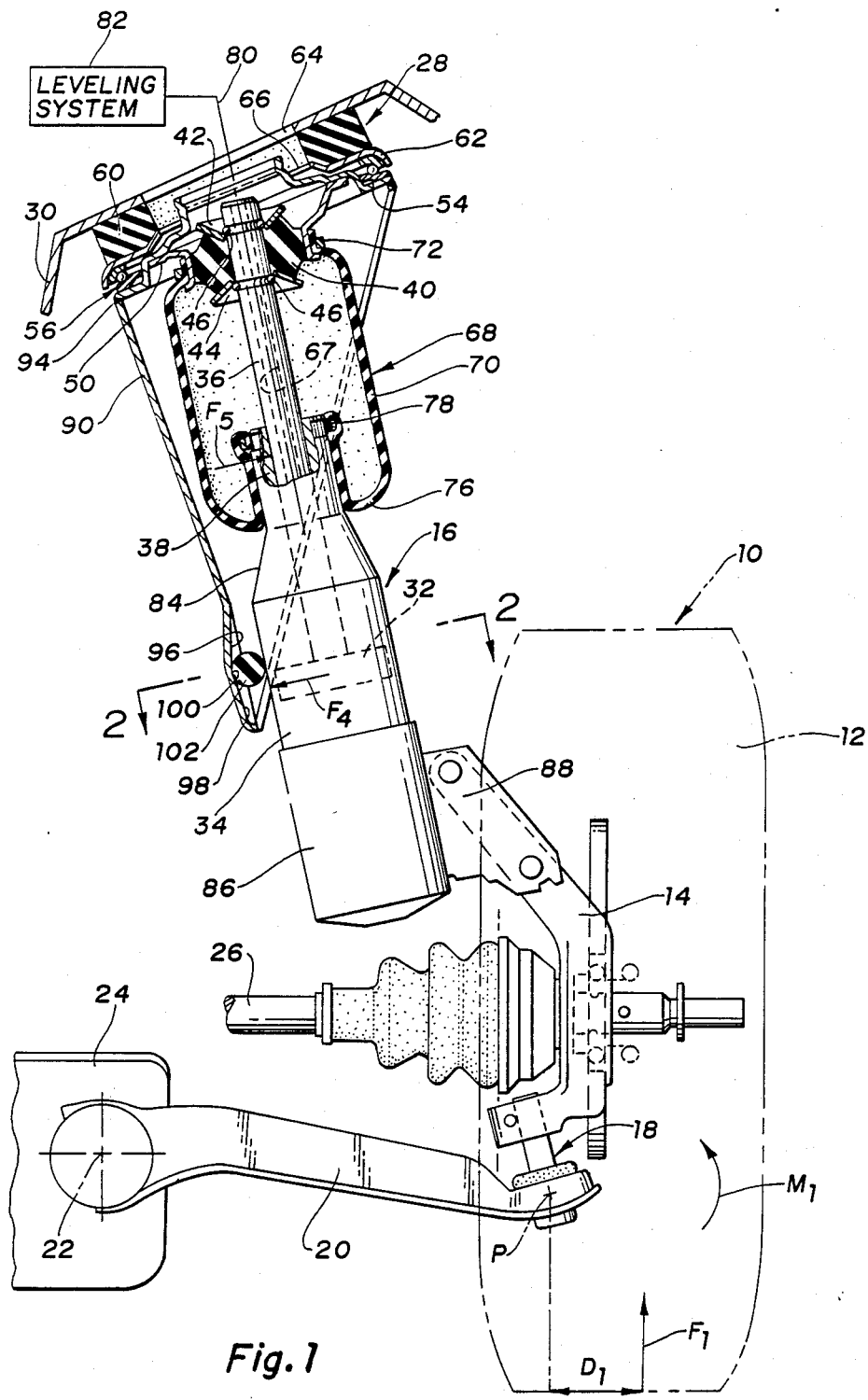
FIG. 1 is an elevational front view with parts in section of a vehicle suspension strut according to this invention.

Turning now in greater detail to the drawings there is shown in FIG. 1 a steerable road wheel assembly 10, including pneumatic tire 12, is operatively mounted on a steering knuckle 14 that is secured to the lower end of a suspension strut 16 and further is supported by means of a lower ball joint 18 to the outboard end of a lower control arm 20. The inboard end of the control arm pivots at 22 from a cross member of the engine cradle 24 of the vehicle frame. The wheel assembly 10 is powered by a drive axle assembly 26 extending from the output of a differential not shown. The suspension strut 16 is shown as an air spring damper that provides the dampened spring suspension attaching the road wheel assembly 10 to an upper mount assembly 28 secured in a mounting tower 30 provided in the body work of the vehicle. The strut 16 has a valved piston 32 operative in a gas or fluid medium contained in cylindrical housing 34 for damping the action of the suspension spring described below. An elongated cylindrical piston strut rod 36 extends from connection with piston 32 upward through a rod guide 38 mounted in the reduced diameter upper neck portion of the housing and extends further upward into attachment to an elastomeric isolator 40 preloaded by upper and lower cone shaped washers 42,44 secured in position on the rod by hog rings 46. The outer periphery of the isolator 40 is secured within a neck of a connector cup 50. The cup 50 has an outer ring welded or otherwise fixed to an annular support plate 54 for the lower race of bearing assembly 56 of the upper mount assembly.

In addition to the lower race the bearing assembly 56 includes an upper race and a cage of ball bearings operatively mounted therebetween allowing the road wheel assembly and suspension strut to be turned together. A cylindrical isolator 60 of elastomeric material is affixed to the top plate 62 of the upper race that seats against the underside of mounting tower 30. An opening 64 in the mounting tower and opening 66 in the top plate 62 of upper mount assembly provide access to the upper end of piston rod 36 and provide a passage for an air line and fitting pneumatically connected to an air passage 67 in the rod 36 for a pneumatic suspension spring.

Figure 2:
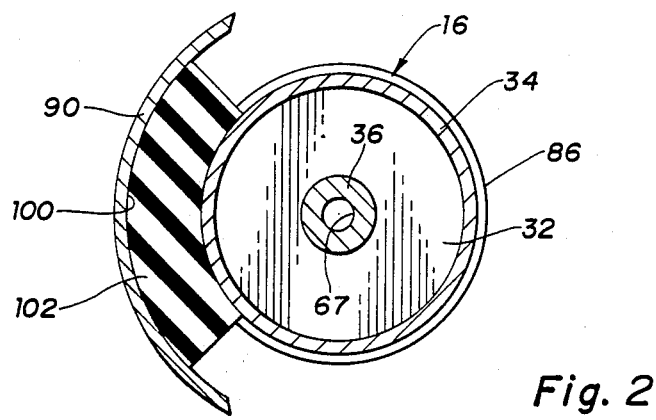
FIG. 2 is a cross sectional view taken generally along lines 2—2 of FIG. 1.

The suspension spring of FIG. 1 is a rolling lobe air spring 68 made from a generally cylindrical boot 70 of a fabric reinforced elastomer material having its upper end secured by a constricted clamp 72 to the lower end of the connector cup 50. The boot extends downwardly from clamp 72 around the piston rod 66 through the inwardly turned rolling lobe 76 and then upwardly along the outer surface of the strut housing 34 to the upper end thereof where it is secured by constricted clamp 78. The air spring 68 is supplied with pressurized air through passage 67 in the rod 36 and line 80 connected there to from a leveling system 82. The lobe of air spring 68 rolls along the surface of the housing including the conical surface 84 which is profiled to tailor the rate of the air spring to meet selected suspension requirements. Downward from the conical surface 84 the housing is cylindrical in form and extends into seating engaging with retainer cup 86. This cup is connected by bracket 88 to the steering knuckle 14. As shown in FIGS. 1 and 2 the side load support bracket 90 is in the general form of a cylinder diagonally sliced top to bottom. The support bracket 90 extends downward from welded annular connection 94 with the bearing support 54 along a side of the air spring and a side of the housing 34. The lower end of the side load support bracket is ramped upward 96 and downward 98 from a center point or vehicle trim height position and cooperates with the strut housing to form a constrictor space or pocket for the rolling side load spring 102 operatively mounted therein. The rolling spring 102 is in the form of an arced cylinder of resilient elastomer material to operatively fit in the pocket between the outer wall of the strut housing and the ramped inner wall of the bracket 90.

When the suspension strut 16 contracts as in jounce, the wheel assembly 10 and strut body 34 move upward relative to the vehicle body as represented by mounting tower 30. This action rolls the side load spring 102 from the trim height position 100 upwardly to effect its squeezing and increasing side load spring force.

This side load spring action provides the lateral force that neutralizes the side load imparted to the strut components and particularly to the rod guide 38 and the piston 32 by the tire patch force $F_1$ offset from the ball joint pivot by distance $D_1$ to provide moment $M_1$. The piston rod 36 imparts a side load $F_5$ on the rod guide 38 and the piston 32 applies a side load $F_4$ proportional to the bearing side load on the housing 34. However with this invention these side loads are effectively neutralized and the piston strokes in the cylinder and the rod in its rod guide without appreciable wear.

Figure 3:
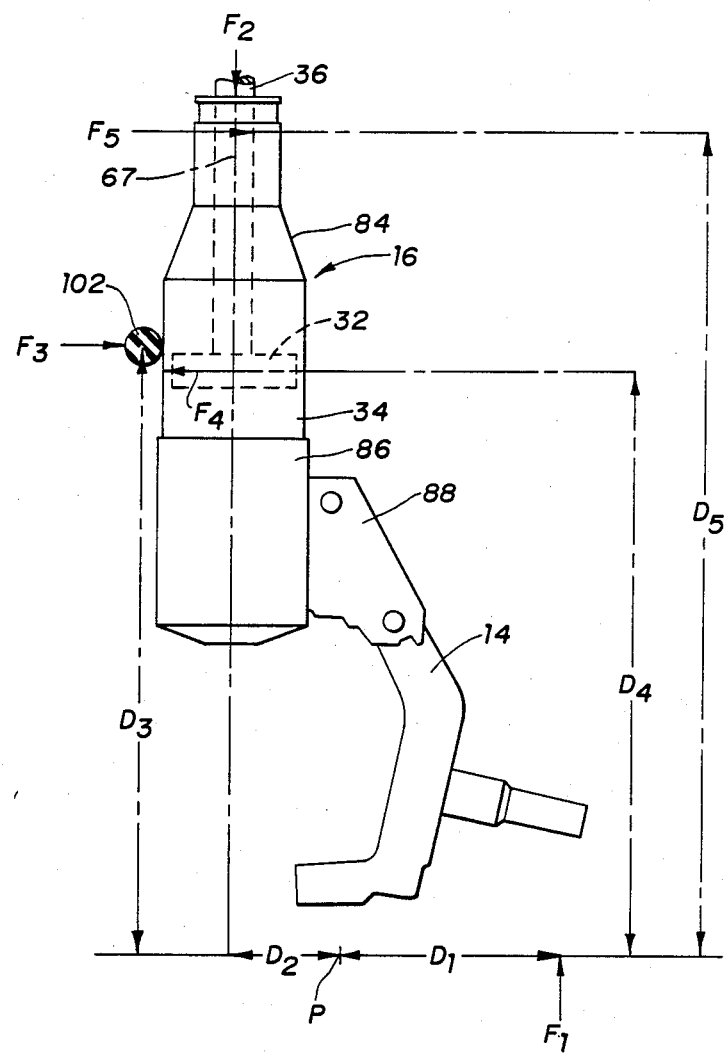
FIG. 3 is a free body diagram illustrating the suspension strut moments of FIG. 1.

In elongation such as in rebound action the spring 100 rolls downwardly on ramp 98 and along side the housing 34 of the unit to slightly increase the side load applied to housing 34 to neutralize the side load imparted by the tire patch moment. In jounce or rebound the elastomer spring element will seek the design location on reversal of strut travel. FIG. 3 is a free body diagram illustrating the moments effective on this strut design of FIG. 1. $F_1$ is the known tire patch force applied at perpendicular distance D1 from the pivot P. $F_2$ is the known air spring load applied at perpendicular distance $D_2$ from pivot ball joint P. $F_3$ is the unknown side load applied at perpendicular distance $D_3$ from the pivot and $F_4$ is the piston side load applied at perpendicular distance $D_4$ from pivot P. $F_5$ is the bearing side load applied at perpendicular distance $D_5$ from pivot P. For equilibrium
$M = F_1D_1 + F_2D_2 - F_3D_3 + F_4D_4 - F_5D_5 = 0$. The force of the side load spring $F_3$ is determined readily when the values assigned to $F_4 = F_5 = 0$. The force $F_3$ can therefore be readily determined and the appropriate size side load spring can be selected.

In FIG. 2 the spring 102 extends about one-fourth the circumference of the body of the housing to provide the rolling contact. If desired, the rolling rubber element may be arcuately extended to provide additional support such as might be needed for vehicle acceleration and braking purposes. This additional support can also be accomplished by using a plurality of rolling elastomer elements arranged about the strut of the strut body. The support bracket is flexibly supported since it is mounted between the compliant elastomer in the upper mount and the compliance of the side load elastomer element 102. This compliance provides design latitude in selecting the stiffness and operating stress level for the rolling elastomer element. The ramp shape of the support bracket and the rolling deformation of the elastomer element can advantageously contribute to the suspension spring rate with increased stiffness and damping properties.

While a preferred embodiment of this invention has been shown and described to illustrate the invention other modifications and configurations will become more apparent to those skilled in the art. Accordingly the scope of this invention is set forth in the following claims.

The embodiments of the invention in which an exclusive property or privilege is claimed are defined as follows:

1. A suspension for an automotive vehicle comprising a suspension strut for mounting a road wheel assembly to body structure in the vehicle, said strut having an elongated housing containing a damping medium attached at one end to said road wheel assembly, suspension spring means associated with said housing for the spring suspension support of said body structure relative to the road wheel assembly, piston means operatively mounted for reciprocating movement within said housing strut to control the action of said suspension spring means during operation of the vehicle along a support surface, said piston means mounted for reciprocating movement in said housing and through said medium, a rod guide supported by said housing, a piston rod operatively connected to said piston means and extending from said piston means through said rod guide into connection with said body structure, a bracket attached to said vehicle body extending along said housing and rolling spring means between said bracket and said housing for applying a side load to said housing for effectively neutralizing side loads on said rod guide and piston means from the support of said road wheel by said strut.

2. A suspension for an automotive vehicle having a body comprising a suspension strut mounting a road wheel assembly to support structure in the vehicle, said strut having an elongated tubular housing having a damping fluid therein and suspension spring means associated therewith for the spring suspension support of said body of the vehicle relative to said road wheel assembly, valved piston means within said housing to control the action of said suspension spring means during operation of the vehicle, a rod guide supported by said housing, a piston rod operatively connected to said piston means and extending in said housing and through rod guide into connection with said body, a curved bracket attached to said body extending along side of said housing and forming ramp means therebetween and rolling elastomer spring means associated with said ramp means and operatively mounted between said bracket and said housing for imparting a side load to said housing to neutralize the side load on said piston rod from the support of said road wheel by said suspension strut from the tire patch load.

3. The suspension strut of claim 2 wherein said ramp means are provided by a pair ramps which extend in a general vertical direction and increase in height from a start position between said ramp.

4. A suspension for an automotive vehicle having body work comprising a suspension strut mounting a steerable road wheel assembly to an upper mount in the vehicle, said strut having an elongated tubular housing containing a damper fluid therein and suspension spring means operatively secured between said housing and said upper mount for the suspension support of said body work relative to said road wheel assembly, valved piston means operative within said housing to control the spring action of said suspension spring means when the vehicle is driven along a roadway, a rod guide supported by said housing, a piston rod operatively connected to said piston means and extending through said housing and rod guide into connection with said upper mount, bearing means connecting said spring means to said upper mount so that said road wheel and strut can be steered, a curved bracket attached to said bearing means extending along said housing, ramp means on said bracket means, and rolling elastomer spring means operatively mounted between said bracket and said housing for imparting a side load to said housing to neutralize the side load resulting from the support of said road wheel assembly at one end of said suspension strut.

5. The suspension strut of claim 4 wherein said ramp means are provided by upward and downward extending ramps which increase in height from a start position defining a design trim position for the vehicle and which cooperate with said housing to form a pocket for said elastomer spring means and wherein said elastomer spring means is self centering back to said start position on reversal of strut travel from any jounce or rebound position.

* * * * *